(12) United States Patent
Lee et al.

(10) Patent No.: US 8,558,805 B2
(45) Date of Patent: Oct. 15, 2013

(54) TOUCH SCREEN PANEL

(75) Inventors: Keun-Soo Lee, Yongin (KR);
Jeong-Yeol Lee, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 272 days.

(21) Appl. No.: 12/926,813

(22) Filed: Dec. 10, 2010

(65) Prior Publication Data
US 2011/0248953 A1    Oct. 13, 2011

(30) Foreign Application Priority Data

Apr. 12, 2010   (KR) .................. 10-2010-0033268

(51) Int. Cl.
*G06F 3/041*   (2006.01)

(52) U.S. Cl.
USPC .......................................................... 345/173

(58) Field of Classification Search
USPC .......................................................... 345/174
See application file for complete search history.

(56) References Cited

U.S. PATENT DOCUMENTS

| | | | | |
|---|---|---|---|---|
| 2002/0067344 A1* | 6/2002 | Chiu | | 345/173 |
| 2008/0309633 A1* | 12/2008 | Hotelling et al. | | 345/173 |
| 2009/0085885 A1* | 4/2009 | Wu et al. | | 345/173 |
| 2009/0146966 A1* | 6/2009 | Liu | | 345/173 |
| 2009/0213090 A1 | 8/2009 | Mamba et al. | | |
| 2009/0315854 A1 | 12/2009 | Matsuo | | |
| 2012/0194474 A1* | 8/2012 | Chang et al. | | 345/174 |

FOREIGN PATENT DOCUMENTS

| | | |
|---|---|---|
| JP | 2009-205321 A | 9/2009 |
| JP | 2010-002958 A | 1/2010 |
| JP | 2010-009456 A | 1/2010 |
| KR | 10 2002-0019671 A | 3/2002 |
| KR | 10-2011-0041043 A | 4/2011 |

* cited by examiner

*Primary Examiner* — Quan-Zhen Wang
*Assistant Examiner* — Nelson D Runkle, III
(74) *Attorney, Agent, or Firm* — Lee & Morse, P.C.

(57) ABSTRACT

A touch screen panel includes a transparent substrate, connecting patterns on the transparent substrate, the connecting patterns including a plurality of first connecting patterns arranged in a first direction and a plurality of second connecting patterns arranged in a second direction, sensing cells including a plurality of first sensing cells connected in the first direction by the first connecting patterns and a plurality of second sensing cells connected in the second direction by the second connecting patterns, and conductive dummy patterns between adjacent sensing cells, the conductive dummy patterns and sensing cells being positioned at different height levels relative to the transparent substrate, and the conductive dummy patterns including prominences projected toward the sensing cells and partially overlapping the sensing cells.

15 Claims, 6 Drawing Sheets

TOUCH SCREEN PANEL

BACKGROUND

1. Field

Example embodiments relate to a touch screen panel, particularly a touch screen panel that is prevented from malfunction by static electricity.

2. Description of the Related Art

A touch screen panel is an input device that selects contents displayed on a screen, such as an image display device, etc., using a person's hand or an object to input commands of a user. For this reason, selected instructions at the touch sites are accepted as an input signal. To this end, the touch screen panel is provided on a front face of the image display device and converts positions directly contacting a person's hand or an object, i.e., the touch sites, into electrical signals. As the touch screen panel can replace a separate input device that is operated by being connected with the image display device, e.g., a keyboard and a mouse, the use field of the touch screen panel is being expanded gradually.

The touch screen panel may include a resistive type, a light sensing type, a capacitive type, etc. For example, when the person's hand or object contacts the touch screen panel in the capacitive type, the conductive sensing pattern at the contact position senses a change in capacitance relative to adjacent sensing patterns or a ground electrode, etc., thereby converting the contacting position into the electrical signals.

In order to clearly determine the contact position on a contacting surface, the sensing pattern is configured to include first sensing patterns formed to be connected in a first direction and second sensing patterns formed to be connected in a second direction via respective first and second connection patterns. Generally, the first connection patterns and the second connection patterns intersect with each other with an insulating layer therebetween and are insulated from each other.

SUMMARY

Embodiments are therefore directed to a touch screen panel, which substantially overcomes one or more of the problems due to the limitations and disadvantages of the related art.

It is therefore a feature of an embodiment to provide a touch screen panel with conductive patterns that minimize static electricity, thereby preventing the touch screen panel from malfunction.

At least one of the above and other features and advantages may be realized by providing a touch screen panel, including a transparent substrate, connecting patterns on the transparent substrate, the connecting patterns including a plurality of first connecting patterns arranged in a first direction and a plurality of second connecting patterns arranged in a second direction, sensing cells including a plurality of first sensing cells connected in the first direction by the first connecting patterns and a plurality of second sensing cells connected in the second direction by the second connecting patterns, and conductive dummy patterns between adjacent sensing cells, the conductive dummy patterns and sensing cells being positioned at different height levels relative to the transparent substrate, and the conductive dummy patterns including prominences projected toward the sensing cells and partially overlapping the sensing cells.

At this time, a distance between the conductive dummy patterns and the sensing cells along a normal to the transparent substrate may be shorter than a distance between the adjacent sensing cells.

In addition, the prominence may be molded to have sharp ends in regions overlapping the sensing cells.

In addition, the conductive dummy patterns may include a transparent electrode material.

In addition, the first connecting patterns and the second connecting patterns may be spaced apart from each other in a substantially same horizontal layer.

In addition, each first connecting pattern may include a plurality of patterns connecting a pair of adjacent first sensing cells.

In addition, the first sensing cells and the second sensing cells may be alternately spaced apart from each other in a substantially same horizontal layer.

In this case, the touch screen may further include a first insulator between the first connecting patterns and the second connecting patterns, wherein the first and second connecting patterns are spaced apart from each other in a substantially same horizontal layer, the first and second connecting patterns being at a different height than the first and second sensing cells relative to the transparent substrate, wherein the first and second connecting patterns partially overlap adjacent first sensing cells and adjacent second sensing cells, respectively, and the first and second connecting patterns are connected to respective adjacent first and second sensing cells via contact holes through the first insulator, the holes being positioned in overlap regions between the connecting patterns and respective sensing cells.

In addition, the touch screen panel may further include a second insulator between the conductive dummy patterns, the conductive dummy patterns being in a substantially same horizontal layer and at a different height than the first and second sensing cells relative to the transparent substrate.

In this case, a thickness of the second insulator may be smaller than a distance between adjacent sensing cells.

In addition, the touch screen panel may further include at least one insulator between the connecting patterns and the conductive dummy patterns, the connecting patterns and the conductive dummy patterns being spaced apart from each other in a substantially same horizontal layer and at a different height than the sensing cells relative to the transparent substrate.

In addition, first sensing cells may be formed to connect in the column direction by the first connecting patterns, and connected to position detection lines respectively in each column. The second sensing cells may be formed to connect in the row direction by the second connecting patterns, and may be connected to the position detection lines respectively in each row.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
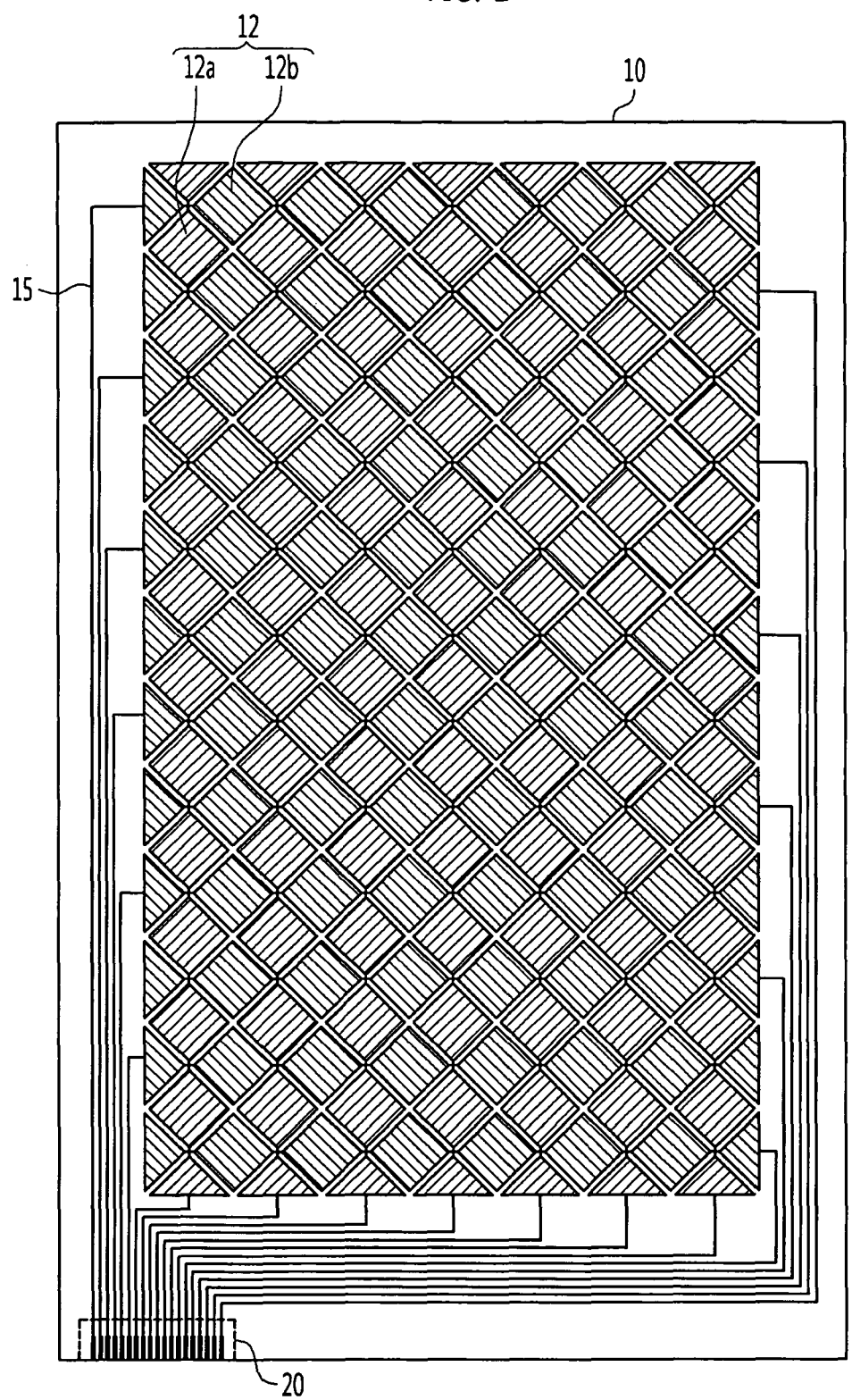
FIG. 1 illustrates a plan view of an example of a touch screen panel.

Korean Patent Application No. 10-2010-0033268 filed on Apr. 12, 2010, in the Korean Intellectual Property Office, and entitled: "Touch Screen Panel" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a plan view of an example of a touch screen panel. Referring to FIG. 1, the touch screen panel may include a transparent substrate 10, sensing cells 12 formed in a touch active region on the transparent substrate 10, and position detection lines 15 that allow the sensing cells 12 to connect with an external driving circuit through a pad unit 20. The position detection lines 15 may be formed in an external touch inactive region around the touch active region.

The sensing cells 12 may be dispersed and arranged in the touch active region on the transparent substrate 10, and may include a plurality of first sensing cells 12a, e.g., connected in a first direction, and a plurality of second sensing cells 12b, e.g., connected in a second direction. The second sensing cells 12b may be dispersed and arranged between the first sensing cells 12a, thereby not overlapping with the first sensing cells 12a.

In other words, the first sensing cells 12a and the second sensing cells 12b may be alternately arranged and may be connected in different directions from each other. For example, the first sensing cells 12a may be connected respectively to position detection lines 15 in each row by connecting in the row direction. The second sensing cells 12b may be connected respectively to position detection lines 15 in each column for connecting in the column direction. The first sensing cells 12a and the second sensing cells 12b may be formed from a transparent electrode material, e.g., ITO, to transmit light from a display panel (not shown) under the sensing cells.

It is noted that only simple lines are shown without codes in FIG. 1, but the touch active region on the transparent substrate 10 may further include connecting patterns that allow the first sensing cells 12a to connect in the first direction, e.g., the row direction, by majority arranging in the first direction and that allow the second sensing cells 12b to connect in the second direction, e.g., the column direction, by majority arranging in the second direction. The connecting patterns will be described in more detail below with reference to FIGS. 2-3B.

The position detection lines 15 may be electrically connected to the first sensing cells 12a and the second sensing cells 12b in each row and each column, thereby connecting to the external driving circuit, e.g., a position detection circuit, through the pad unit 20. The position detection lines 15 may be positioned in the outside of the touch screen panel, i.e., not in the touch active region displaying an image. The position detection lines 15 may be formed of any suitable material, e.g., a low-resistance material in addition to the transparent electrode materials used for forming the sensing cells 12. Examples of low-resistance materials may include Mo, Ag, Ti, Cu, Ti, Mo/Al/Mo, and the like.

The touch screen panel as mentioned above is a capacitive-type touch screen panel. When a surface of the touch screen panel is contacted by an object, e.g., a human hand, a stylus pen, and the like, the change of static capacity according to the contact position is transmitted from the sensing cells 12 to the driving circuit (not shown) through the pad unit 20 and the position detection lines 15. Then the contact position is confirmed by changing from the change of the static capacity to the electric signal through X and Y input processing circuit (not shown).

Figure 2:
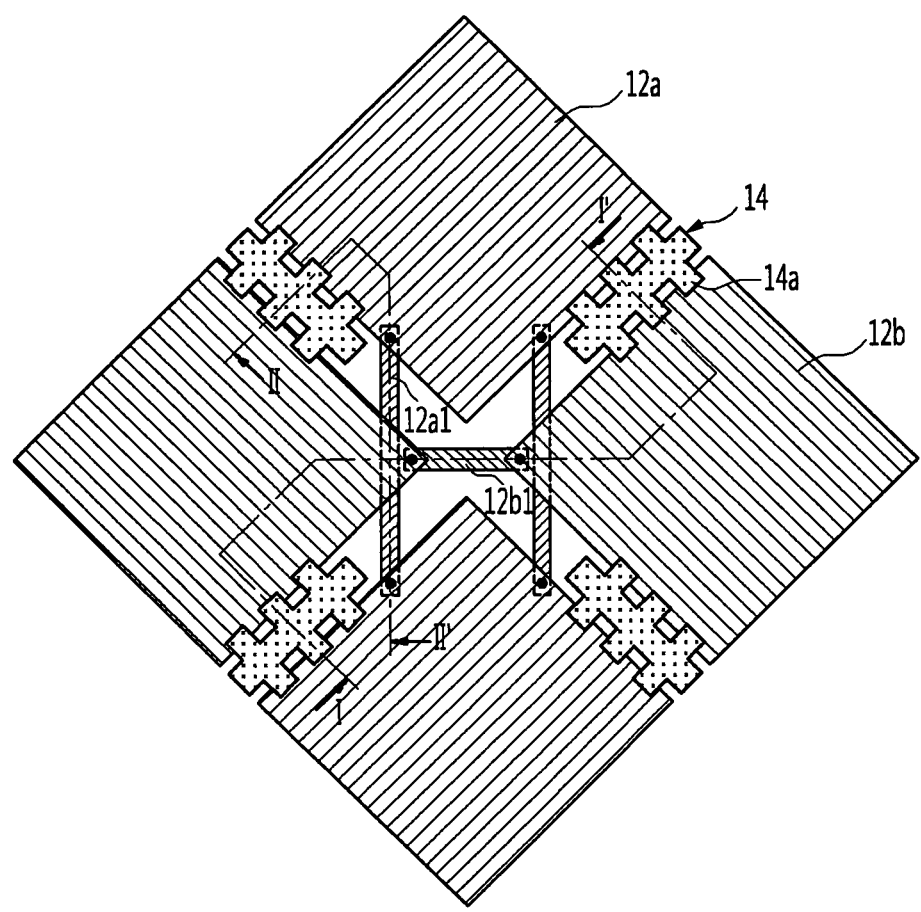
FIG. 2 illustrates a detailed plan view of sensing cells in a touch screen panel according to an embodiment.
Figure 3A:
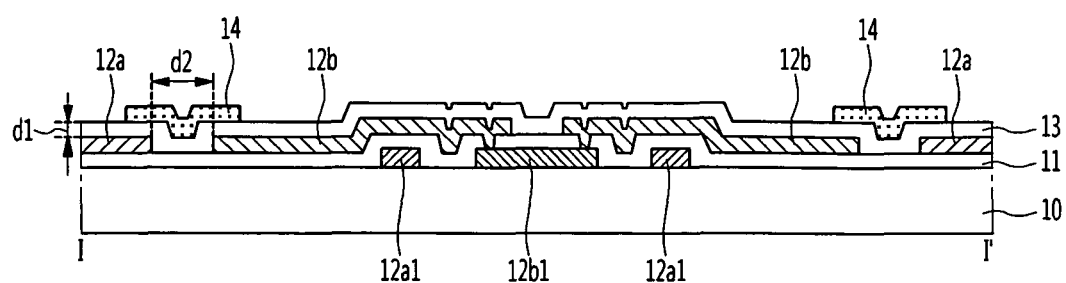
FIG. 3A and FIG. 3B illustrate cross-sectional views taken along lines I-I' and II-II' of FIG. 2, respectively.
Figure 3B:
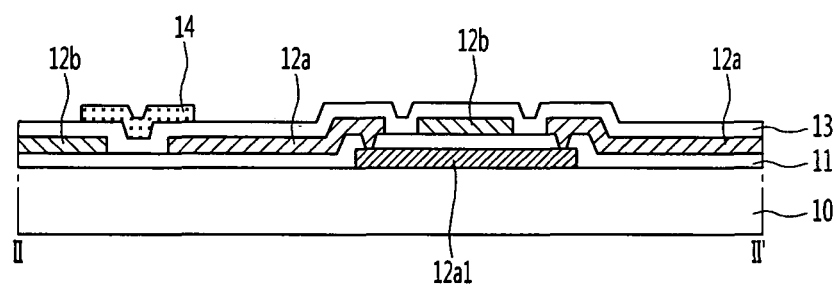

FIG. 2 illustrates a detailed plan view of a configuration of sensing cells, connecting patterns, and dummy patterns of a touch screen panel according to an embodiment. FIG. 3A and FIG. 3B illustrate cross-sectional views taken along lines I-I' and II-II' of FIG. 2, respectively.

For convenience, in FIG. 2, only two adjacent first sensing cells 12a with first connecting patterns 12a1 therebetween, and two adjacent second sensing cells 12b with a connecting pattern 12b1 therebetween are shown. However, in a real touch screen panel, the structure as depicted in FIG. 2 is repeatedly arranged in the touch active region. Therefore, hereinafter the plural form about the entire first connecting pattern 12a1 and the second connecting pattern 12b1 are described.

Referring to FIGS. 2-3B, the touch screen panel according to example embodiments may include connecting patterns having the plurality of the first connecting patterns 12a1 and the second connecting patterns 12b1 arranged respectively in the first direction and the second direction on the transparent substrate 10. The plurality of the first sensing cells 12a may be connected in the first direction by the first connecting patterns 12a1, and the plurality of the second sensing cells 12b1 may be connected in the second direction by the second connecting patterns 12b1. As further illustrated in FIG. 2, the touch screen panel may include conductive dummy patterns 14 with a prominence 14a projected in a direction toward the sensing cells 12a, 12b to partially overlap the sensing cells 12a, 12b. The conductive dummy patterns 14 may be positioned between the adjacent sensing cells 12a, 12b in the upper or lower layer of the layer positioned with the sensing cells 12a, 12b. In other words, each conductive dummy pattern 14 may be between a first sensing cell 12a and an adjacent second sensing cell 12b, e.g., may extend along a space therebetween in an oblique direction with respect to the first and second directions. For example, each conductive dummy pattern 14 may include a plurality of prominences, i.e., projections, on each side to extend toward and overlap a respective one of the first and second sensing cells 12a and 12b. The conductive dummy patterns 14 will be described in more detail below.

As illustrated in FIGS. 3A and 3B, the touch screen panel may include at least one insulator. For example, a first insulator 11 may be positioned between the first and second connecting patterns 12a1 and 12b1, and a second insulator 13 may be positioned between the first sensing cells 12a and the second sensing cells 12b. Further, the first and second insulators 11 and 13 may be positioned in different layers, as compared to the connecting patterns 12a1, 12b1 and the conductive dummy patterns 14, to separate the sensing cells 12a, 12b from the conductive dummy patterns 14 and respective connecting patterns.

For example, as illustrated in FIGS. 3A and 3B, the first and second connecting patterns 12a1 and 12b1 may be positioned in a same layer under the first and second sensing cells 12a and 12b, which are positioned in a same layer. Therefore, the first insulator 11 may be positioned between the layer of the connecting patterns 12a1, 12b1 and the layer of the sensing cells 12a, 12b. However, embodiments are not limited thereto, and the first and second connecting patterns 12a1 and 12b1 may be positioned in a layer over or under the dummy patterns 14 or sensing cells 12a, 12b. Further, the connecting patterns 12a1, 12b1 and conductive dummy patterns 14 may be positioned in the same layer or different layers according to the plan structure. It is noted that "in a same layer" or "in a substantially same horizontal layer" refers to elements positioned at a substantially same height relative to the transparent substrate 10, i.e., at a substantially same distance from the transparent substrate 10 along a normal to the transparent substrate 10. Similarly, "a layer over or under" another layer refers to elements at different height levels, i.e., different distances, relative to the transparent substrate 10.

For example, as illustrated in FIG. 2 to FIG. 3B, a layer structure layered in the order of the first and second connecting patterns 12a1, 12b1, the first insulator 11, the sensing cells 12a, 12b, the second insulator 13, and the dummy patterns 14 may be sequentially formed on the transparent substrate 10. In detail, the touch screen panel according to an embodiment may include the first sensing cells 12a and the second sensing cells 12b that are alternately formed apart from each other in the same first layer on the transparent substrate 10, the first connecting patterns 12a1 and the second connecting patterns 12b1 that are distantly positioned in the second layer positioned under the first layer and include the insulator 11 therebetween, and the dummy patterns 14 that are arranged in a third layer positioned over the first layer and include the second insulator 13 therebetween.

As illustrated in FIG. 2, the first connecting patterns 12a1 and the second connecting patterns 12b1 may not intersect each other and may be positioned in a same layer. In other words, in an example embodiment, the first connecting patterns 12a1 may connect adjacent first sensing cells 12a without intersecting the second connecting patterns 12b1 that connect adjacent second sensing cells 12b. For this reason, as an intersection between the first and second connecting patterns is eliminated, concentration of static electricity at such intersections may be eliminated as well. Therefore, vulnerability of the first connecting patterns 12a1 and the second connecting patterns 12b1 to static electricity may be prevented or substantially minimized.

In detail, the first connecting patterns 12a1 and the second connecting patterns 12b1 may be configured with one or more patterns for connecting the adjacent sensing cells 12a, 12b. For example, one or more connecting patterns among the first connecting patterns 12a1 and the second connecting patterns 12b1 may be configured with a plurality of patterns.

For example, as illustrated in FIG. 2, the first connecting patterns 12a1 that allow the first sensing cells 12a to connect in the first direction, i.e., the long side of the touch screen panel, may be configured with two patterns for connecting two adjacent first sensing cells 12a. That is, two first connecting patterns 12a1 may be spaced apart from each other along the second direction, and may connect two adjacent first sensing cells 12a along the first direction. Further, one second connecting pattern 12b1 may extend in the space between the two first connecting patterns 12a1 to connect two adjacent second sensing cells 12b along the second direction without contacting or intersecting the first connecting patterns 12a1. In this case, the sensing sensitivity can be improved because charge flow in the first connecting patterns 12a1 may be smoother, and an intersection region between the first and second connecting patterns 12a1 and 12b1 may be eliminated.

The first connecting patterns 12a1 and the second connecting patterns 12b1 may partially overlap two adjacent first sensing cells 12a and second sensing cells 12b, respectively, and may be connected respectively to the first sensing cells 12a and the second sensing cells 12b by contact hole formed on the first insulator 11 in the overlap region. In other words, contact holes may be formed in the first insulator 11 in an overlap region of the first connecting patterns 12a1 and the first sensing cells 12a and in an overlap region of the second connecting patterns 12b1 and the second sensing cells 12b. For this reason, the first connecting patterns 12a1 allow the adjacent first sensing cells 12a to connect electrically, and the second connecting patterns 12b1 allow the adjacent second sensing cells 12b to connect electrically.

The first connecting patterns 12a1 and the second connecting patterns 12b1 may be formed by using a transparent electrode material, e.g., a same material as the first sensing cells 12a and the second sensing cells 12b, or a low resistance opaque electrode material, e.g., a same material as the position detecting lines 15. Further, visibility of the first and second connecting patterns 12a1 and 12b1 may be minimized by controlling their width, thickness, length, and the like.

The conductive dummy patterns 14 may be formed by of a conductive material for inducing static electricity, and may be positioned between the adjacent sensing cells 12a, 12b. For example, as illustrated in FIGS. 3A and 3B, the conductive dummy patterns 14 may be positioned over the sensing cells 12a, 12b by using a transparent electrode material, e.g., ITO. As described previously, the conductive dummy patterns 14 may include the prominence 14a projected in the direction toward the sensing cells 12a, 12b to partially overlap the sensing cells 12a, 12b.

A distance between the conductive dummy patterns 14 and the sensing cells 12a, 12b may be adjusted to be shorter than a distance between adjacent sensing cells 12a, 12b, thereby inducing static electricity toward the conductive dummy patterns 14. In detail, a first distance d1, i.e., a shortest distance along a normal to the transparent substrate 10 between the conductive dummy patterns 14 and a portion of the sensing cells 12a, 12b overlapping the conductive dummy patterns 14, may be adjusted to be shorter than a second distance d2, i.e., a shortest distance between the adjacent sensing cells 12a, 12b along a direction perpendicular to that of the first distance d1. To achieve this, a thickness of the second insulator 13 may be set to be smaller than the second distance d2. For example, the first distance d1, i.e., the thickness of the second insulator 13, may be 3,000 Å, and the second distance d2 may be about 10 μm.

As mentioned above, the first distance d1 between the dummy patterns 14 and the sensing cells 12a, 12b overlapped with the dummy patterns 14 may be set smaller than the second distance d2 between the adjacent sensing cells 12a, 12b. For this reason, when producing static electricity, static electricity may be induced to be transmitted through the dummy patterns 14 which are closer. Therefore, malfunction of the touch screen panel due to static electricity may be prevented, thereby preventing damage, e.g., defects or shorts, of the sensing cells 12a, 12b and/or the connecting patterns 12a1, 12b1 by static electricity.

It is noted that materials of the conductive dummy patterns 14 are not limited to the described above. For example, the conductive dummy patterns 14 may be formed by using low resistance opaque electrode materials.

According to embodiments, the conductive dummy patterns 14 may be positioned between the adjacent sensing cells 12a, 12b and on the sensing cells 12a, 12b, and may include the prominence 14a projected in the direction toward the sensing cells 12a, 12b to overlap partially with the sensing cells 12a, 12b. For this reason, static electricity may be dispersed and transmitted from the sensing cells 12a, 12b to the conductive dummy patterns 14, thereby preventing malfunction of the touch screen panel caused by static electricity.

In addition, the first connecting patterns 12a1 that allow the adjacent first sensing cells 12a to connect, and the second connecting patterns 12b1 that allow the adjacent second sensing cells 12b to connect may be configured not to intersect each other. Therefore, vulnerability of the first connecting patterns 12a1 and the second connecting patterns 12b1 may be minimized.

Figure 4:
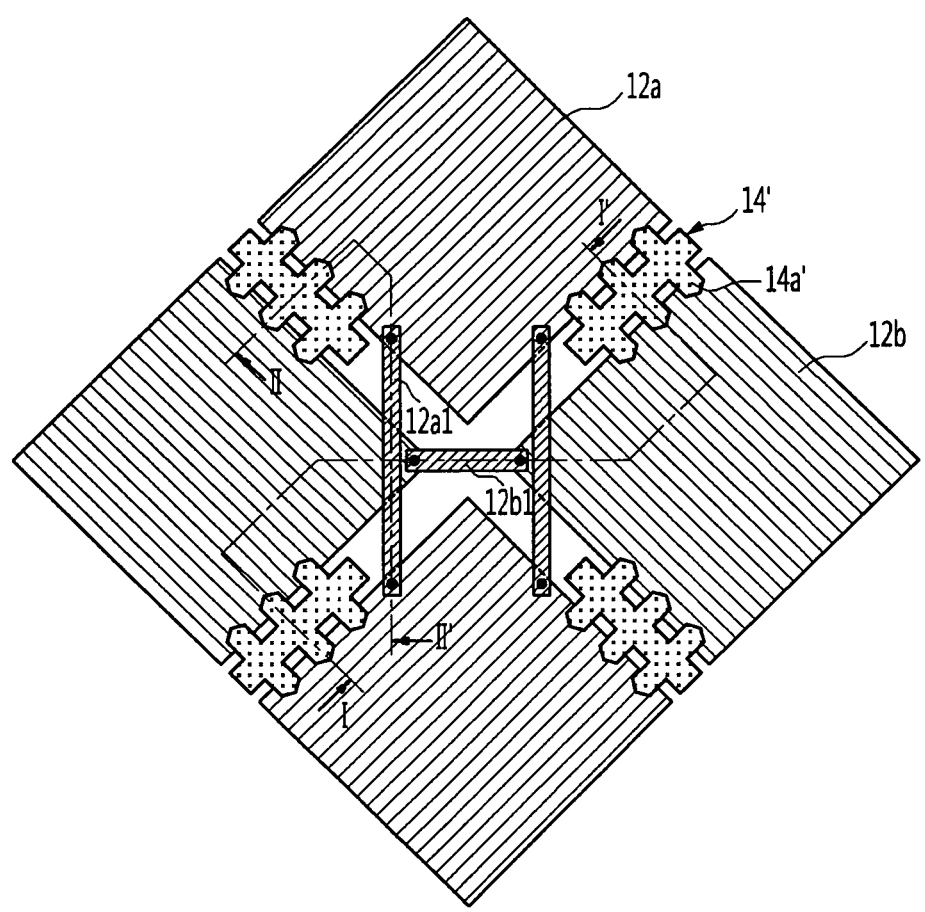
FIG. 4 illustrates a detailed plan view of sensing cells according to another embodiment.

It is further noted that embodiments are not limited to the shape of the conductive dummy patterns 14 illustrated in FIG. 2, as the conductive dummy patterns 14 may be freely modified within a range that can achieve the effect of the embodiments. For example, as illustrated in FIG. 4, a touch screen panel may include conductive dummy patterns 14' with a prominence 14a' that is molded to have a sharp end, i.e., having a triangular cross-section in plan view, in the direction toward the sensing cells 12a, 12b overlapped with the prominence 14a'. When producing static electricity, the shape of the prominences 14a' may be modified to introduce more effectively static electricity into the conductive dummy patterns 14'.

In addition, the positions of the sensing cells 12a, 12b and the connecting patterns 12a1, 12b1 may be changed. For example, as illustrated in FIG. 4, the sensing cells 12a, 12b may be positioned under the connecting patterns 12a1, 12b1. That is, the sensing cells 12a, 12b may be between the transparent substrate 10 and the connecting patterns 12a1, 12b1. The conductive dummy patterns 14' may be in a same layer as or above the connecting patterns 12a1, 12b1.

In addition, the position relationship between the sensing cells 12a, 12b and the conductive dummy patterns 14, 14' may be reversed. For example, the dummy patterns 14, 14' may be positioned under the sensing cells 12a, 12b, as will be described in more detail below with reference to FIG. 5 through FIG. 6B.

Figure 5:
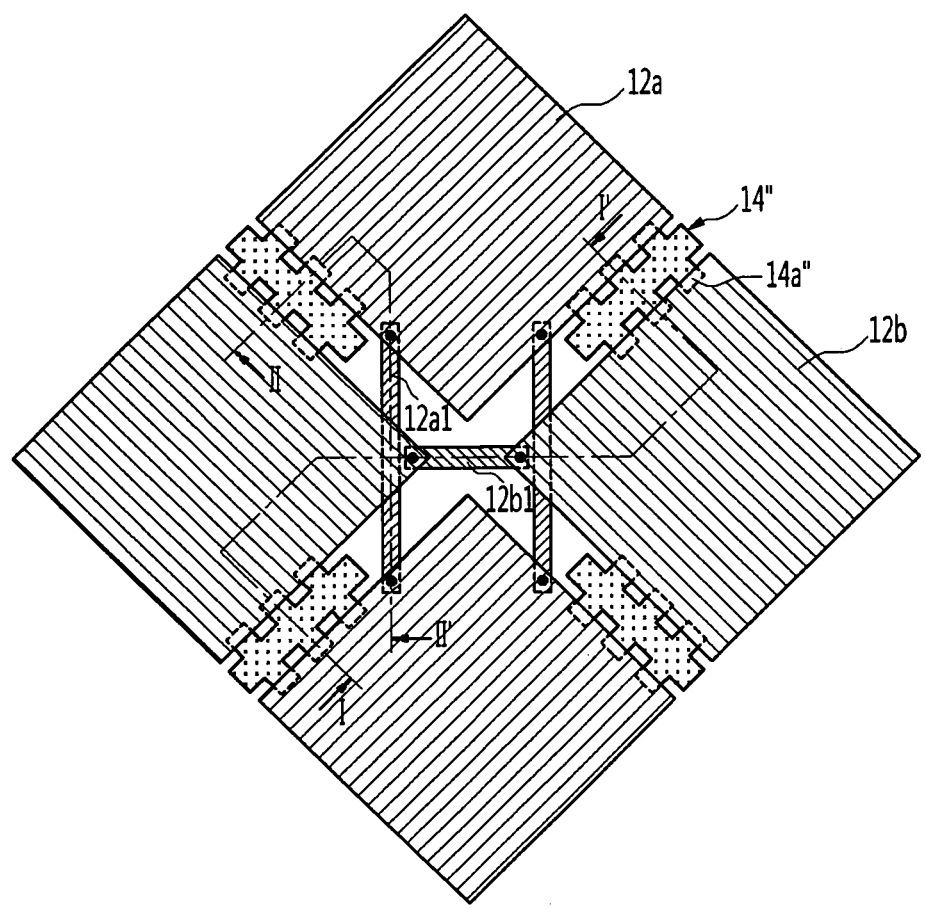
FIG. 5 illustrates a detailed plan view of sensing cells according to another embodiment.
Figure 6A:
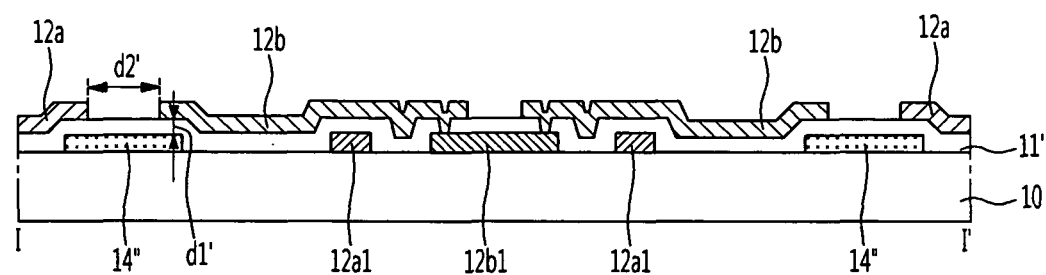
FIG. 6A and FIG. 6B illustrate cross-sectional views taken along lines I-I' and II-II' of FIG. 5, respectively.
Figure 6B:
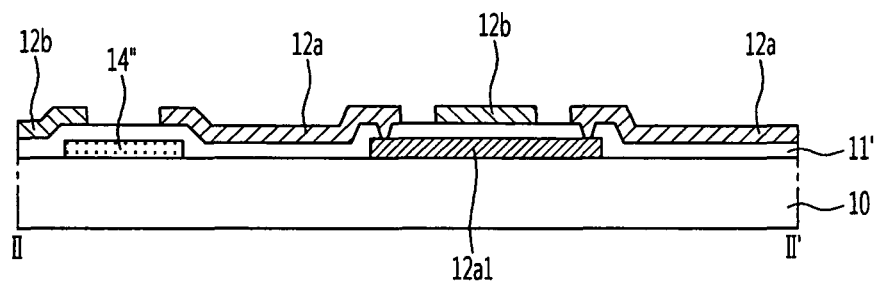

FIG. 5 illustrates a detailed plan view of sensing cells, connecting patterns, and dummy patterns according to another embodiment. FIG. 6A and FIG. 6B illustrate cross-sectional views taken along lines I-I' and II-II' of FIG. 5, respectively. For convenience, detailed description of same or similar components in FIGS. 5-6B described previously with reference to FIGS. 2-3B will not be repeated.

Referring to FIG. 5 through FIG. 6B, the touch panel screen may include conductive dummy patterns 14". The conductive dummy pattern 14" may include one or more insulators 11' therebetween, and may be positioned in a same layer as the connecting patterns 12a1, 12b1. For example, the conductive dummy pattern 14" and the connecting patterns 12a1, 12b1 may be directly on the transparent substrate 10, such that the insulator 11' and the sensing cells 12a, 12b may be sequentially formed thereon. In other words, the dummy patterns 14" may be between the transparent substrate 10 and the sensing cells 12a, 12b.

In the embodiment of FIGS. 5-6B, a first distance d1', i.e., a shortest distance between the conductive dummy patters 14" and the sensing cells 12a, 12b overlapped with the dummy patterns 14" are may be shorter than the second distance d2', i.e., a shortest distance between adjacent sensing cells 12a, 12b. Therefore, induction of static electricity through the dummy patterns 14" may be facilitated.

As further illustrated in FIG. 6A and FIG. 6B, the dummy pattern 14" and the first and the second connecting patterns 12a1, 12b1 may include one or more insulators 11' therebetween. The dummy patterns 14" and the first and the second connecting patterns 12a1, 12b1 may be separated from each other by a predetermined distance in a same layer positioned under the layer of the first sensing cells 12a and the second sensing cells 12b.

It is further noted that embodiments are not limited to the described above. For example, the dummy patterns 14" and the first and second connecting patterns 12a1, 12b1 may be positioned over the first sensing cells 12a and the second sensing cells 12b. In this case, the dummy patterns 14" and the first and the second connecting patterns 12a1, 12b1 may be separates by a distance in a same layer.

According to example embodiments, conductive dummy patterns may be positioned between adjacent sensing cells, e.g., in a layer below or above the sensing cells, and may include prominences projected toward the sensing cells to partially overlap the sensing cells. For this reason, static electricity may be dispersed and discharged through conductive dummy patterns, thereby preventing malfunction of the touch screen panel due to static electricity.

In addition, the first and second connecting patterns that connect respective first and second sensing cells may not intersect each other, thereby vulnerability of the first connecting patterns and the second connecting patterns to static electricity may be minimized. In contrast, since a conventional touch screen panel includes intersecting first and second connecting patterns with narrower widths than those of respective sensing cells, resistance of the connecting patterns may be relatively large. Further, since a thickness of the insulator between the intersecting first and second connecting patterns is thin due to limit of manufacturing process, the intersection between the first and second connecting patterns in the conventional touch screen panel may be easily damaged, e.g., dielectric breakdown, by static electricity, thereby causing malfunction of the touch screen panel.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A touch screen panel, comprising:
    a transparent substrate;
    connecting patterns on the transparent substrate, the connecting patterns including a plurality of first connecting patterns arranged in a first direction and a plurality of second connecting patterns arranged in a second direction;
    sensing cells including a plurality of first sensing cells connected in the first direction by the first connecting patterns and a plurality of second sensing cells connected in the second direction by the second connecting patterns; and
    conductive dummy patterns between adjacent sensing cells, the conductive dummy patterns and sensing cells being positioned at different height levels relative to the transparent substrate, and the conductive dummy patterns including prominences projected toward the sensing cells and partially overlapping the sensing cells, wherein a distance between the conductive dummy patterns and the sensing cells along a normal to the transparent substrate is shorter than a distance between the adjacent sensing cells, and wherein each conductive dummy pattern includes:
- a first portion extending only in a space between two adjacent sensing cells, and
- a plurality of prominences extending from each side of the first portion toward a respective one of the two adjacent sensing cells, only the prominences partially overlapping the adjacent sensing cells.

2. The touch screen panel as claimed in claim 1, wherein the prominences include sharp ends in regions overlapping the sensing cells.

3. The touch screen panel as claimed in claim 1, wherein the conductive dummy patterns include a transparent electrode material.

4. The touch screen panel as claimed in claim 1, wherein the first connecting patterns and the second connecting patterns are spaced apart from each other in a substantially same horizontal layer.

5. The touch screen panel as claimed in claim 1, wherein each first connecting pattern includes a plurality of patterns connecting a pair of adjacent first sensing cells.

6. The touch screen panel as claimed in claim 1, wherein the first sensing cells and the second sensing cells are alternately spaced apart from each other in a substantially same horizontal layer.

7. The touch screen panel as claimed in claim 6, further comprising a first insulator between the first connecting patterns and the second connecting patterns,
- wherein the first and second connecting patterns are spaced apart from each other in a substantially same horizontal layer, the first and second connecting patterns being at a different height than the first and second sensing cells relative to the transparent substrate,
- wherein the first and second connecting patterns partially overlap adjacent first sensing cells and adjacent second sensing cells, respectively, and
- the first and second connecting patterns are connected to respective adjacent first and second sensing cells via contact holes through the first insulator, the holes being positioned in overlap regions between the connecting patterns and respective sensing cells.

8. The touch screen panel as claimed in claim 6, further comprising a second insulator between the conductive dummy patterns, the conductive dummy patterns being in a substantially same horizontal layer and at a different height than the first and second sensing cells relative to the transparent substrate.

9. The touch screen panel as claimed in claim 8, wherein a thickness of the second insulator is smaller than a distance between adjacent sensing cells.

10. The touch screen panel as claimed in claim 6, further comprising at least one insulator between the connecting patterns and the conductive dummy patterns, the connecting patterns and the conductive dummy patterns being spaced apart from each other in a substantially same horizontal layer and at a different height than the sensing cells relative to the transparent substrate.

11. The touch screen panel as claimed in claim 1, wherein:
- the first sensing cells are connected in a row direction by the first connecting patterns and are connected to position detection lines in each row, respectively; and
- the second sensing cells are connected in a column direction by the second connecting patterns and are connected to position detection lines in each column, respectively.

12. The touch screen panel as claimed in claim 1, wherein the first sensing cells are connected only in the first direction by the first connecting patterns, and the second sensing cells are connected only in the second direction by the second connecting patterns, each of the first and second sensing cells being connected to not more than two adjacent sensing cells.

13. The touch screen panel as claimed in claim 12, wherein every two adjacent sensing cells in the first direction are connected to each other via two first connecting patterns, the two first connecting patterns being spaced apart from each other along the second direction to overlap two sensing cells adjacent to each other along the second direction.

14. The touch screen panel as claimed in claim 13, wherein the two sensing cells adjacent to each other along the second direction are connected to each other by a single second connecting pattern, the second connecting pattern extending between the two first connecting patterns, and a length of the second connecting pattern being smaller than a distance between the two first connecting patterns.

15. The touch screen panel as claimed in claim 1, wherein a longitudinal direction of each conductive dummy pattern is different than each of the first and second directions.

* * * * *